United States Patent Office 3,547,818
Patented Dec. 15, 1970

3,547,818
ALCOHOLIC IONIC COMPOSITIONS CONTAINING A METAL SELECTED FROM Hg (II), Cu (II), Ag (I), Cd (II), Ni (II), Zn (II),, AND Co (II)
Robert C. Wade, Ipswich, Mass., assignor to Ventron Corporation, Beverly, Mass., a corporation of Massachusetts
No Drawing. Continuation-in-part of application Ser. No. 796,612, Feb. 4, 1969. This application Apr. 7, 1969, Ser. No. 814,207
Int. Cl. C23b 5/02
U.S. Cl. 252—1
11 Claims

ABSTRACT OF THE DISCLOSURE

The invention provides ionic compositions which are solutions of oxides, hydroxides or salts of a metal selected from Hg (II), Zn (II), Cd (II), Ag (I), Cu (II), Ni (II), Co (II), or mixtures thereof in an alcoholic solution of a polymer of ethylene imine having a molecular weight between about 600 and 100,000 and in which the nitrogen atoms are separated by not more than two carbon atoms and the primary, secondary and tertiary imine nitrogen ratio is about 1 to 2 to 1, respectively. The alcoholic solution being that of methanol, ethanol, propanol, isopropanol, ethylene glycol or propylene glycol. The salts are halides, sulfates, nitrates or acetates. These compositions may be applied as a coating to various anionic substrates, such as cotton, glass, silica, alumina, leather, paper or starch, and dried.

This invention relates to alcoholic metal-containing solutions or compositions which are useful for coating various anionic substrates, such as cotton, glass, silica, alumina, leather, paper or starch.

This application is a continuation-in-part of my copending application Ser. No. 796,612, filed Feb. 4, 1969, in which I have described ionic compositions comprising solutions of a metal compound consisting of oxides or hydroxides of a metal selected from the group consisting of Hg (II), Zn (II), Cd (II), Ag (I), Cu (II), Ni (II), Co (II) and mixtures thereof in an aqueous solution of a polymer of ethylene imine having a molecular weight between about 600 and 100,000 and in which the nitrogen atoms and the primary, secondary and tertiary imine nitrogen ratio is about 1 to 2 to 1, respectively. These polymers are manufactured by the Dow Chemical Co. and sold under the trademark "PEI." The compositions described in said application are sufficiently ionic so that the contained metal may be electroplated onto various substrates, such as copper, brass and iron without adding an alkaline material to the solution, or may be displaced from the solution by metals higher in the electromotive series and platings or amalgams can be made by dipping metals, such as copper or aluminum into the solution. Furthermore, various anionic substrates, such as cotton, glass, silica, alumina, leather, paper and starch, can be coated with these ionic solutions to bond firmly the metal to the substrate to form a desired coating thereon when dried, such as a bacteriocidal coating, or for preparation of catalytic surfaces.

I have since discovered that similar ionic compositions may be prepared by dispersing the oxide, hydroxide or salt of a metal selected from the above mentioned group of metals in the above mentioned polymers to provide a dispersion containing between about 3 to 10 parts by weight of polymer to 1 part of metal compound. Then, a desired amount of an alcohol, such as methanol, ethanol, propanol, isopropanol, ethylene glycol or propylene glycol may be added slowly with stirring until the metal compound is partly or completely dissolved. In some cases, the mixture may be heated to 40°–50° C. to assist solution. The amount of alcohol used will vary with the metal compound used and the desired final concentration. An amount of alcohol between about 10 ml. to 100 ml. per gram of metal compound is usually suitable. As a salt of the selected metal, I prefer the chloride, sulfate or nitrate but salts of other acids may be used, such as the salts of other halogen acids, such as bromides, iodides, fluorides, and organic acids, such as acetate. These ionic compositions are particularly useful to coat various anionic substrates, such as cotton, glass, silica, alumina, leather, paper and starch, and drying the coating.

The invention is illustrated further by the following specific examples.

EXAMPLE 1

1 gram of red oxide of mercury was dispersed in 4 grams of polymer (PEI–6). The volume was brought to 50 ml. by the addition of methanol. Some solution of the oxide appeared to take place at room temperature. The solution was warmed to 40°–50° C. for several hours with stirring. More oxide dissolved. After standing at room temperature for about a week, most of the oxide had dissolved but a small amount remained undissolved. The clear solution was tested for mercury by adding a few drops of sodium sulfide solution to a few ml. of this solution. A heavy brownish-black precipitate was obtained showing that mercury was dissolved in the methanol solution and the complex is ionic in nature.

EXAMPLE 2

1 gram of red oxide of mercury was dispersed in 4 grams of polymer (PEI–6). Then isopropanol was added to bring the total volume to 100 ml. The oxide dissolved very slowly even when the suspension was warmed to 40–50° C. for several hours. All of the mercuric oxide did not dissolve even after standing at room temperature for 1 week. However, an appreciable amount (about 50%) of the oxide did dissolve. A portion of the clear solution was tested with sodium sulfide solution and gave a heavy brownish-black precipitate. This clearly indicates a substantial amount of the ionic mercuric complex is dissolved in isopropanol.

EXAMPLE 3

1 gram of anhydrous $CoCl_2$ was dispersed in 5 grams of polymer (PEI–6). Then isopropanol was added to bring the volume to 100 ml. The mixture was stirred for 3 hours at 40–50° C. Part of the $CoCl_2$ dissolved to give a reddish-brown complex solution. Part of the brown complex remained undissolved.

EXAMPLE 4

1 gram of anhydrous $CoCl_2$ was dispersed in 5 grams of polymer (PEI–6). Then methanol was added to bring the volume to 100 ml. The mixture was stirred for 1 hour. All of the $CoCl_2$ dissolved to give a reddish-brown complex solution. This shows that anhydrous PEI-metal salt complexes can be formed that are soluble in lower alcohols.

EXAMPLE 5

1 gram of anhydrous $CoCl_2$ was dispersed in 5 grams of polymer (PEI–18). The anhydrous ethanol was added to bring the volume to about 100 ml. The mixture was stirred for 1 hour. The $C_oCl_2$ complexed and dissolved completely to give a dark reddish-brown solution which was very substantive to anionic substrates. Similar results were obtained when ethylene glycol and propylene glycol were substituted for ethanol.

EXAMPLE 6

1 gram of anhydrous $CuSO_4$ was dispersed in 5 grams of polymer (PEI–6). Then methanol was added to give a total volume of 100 ml. The mixture was stirred for 1 hour. All the $CuSO_4$ complexed and dissolved to give a deep blue solution. Exactly the same results were obtained when anhydrous ethanol, ethylene glycol and propylene glycol were substituted for methanol.

A similar complex was formed, but very much more slowly when isopropanol was substituted for methanol. About 3 hours stirring was required at 40–50° C. to get part of the anyhydrous $CuSO_4$ to dissolve. The remainder was complexed to give a deep blue colored solid which did not dissolve.

I claim:

1. An ionic composition comprising a solution of a metal compound selected from the group consisting of oxides, hydroxides and salts of a metal selected from the group consisting of Hg (II), Zn (II), Cd (II), Ag (I), Cu (II), Ni (II)), Co (II) and mixtures thereof in an alcohol solution of a polymer of ethylene imine having a molecular weight between about 600 and about 100,000 and in which the nitrogen atoms are separated by not more than two carbon atoms and the primary, secondary and tertiary imine nitrogen ratio is about 1 to 2 to 1, respectively, said salts being selected from the group consisting of halides, sulfates, nitrates, and acetates, said alcoholic solution being that of an alcohol selected from the group consisting of methanol, ethanol, propanol, isopropanol, ethylene glycol and propylene glycol.

2. An anionic substrate coated with a composition as claimed by claim 1 after drying.

3. An ionic composition as claimed by claim 1 wherein the salt is chloride.

4. An ionic composition as claimed by claim 3 wherein the alcohol is methanol.

5. An ionic composition as claimed by claim 3 wherein the alcohol is ethanol.

6. An ionic composition as claimed by claim 1 wherein the salt is sulfate.

7. An ionic composition as claimed by claim 6 wherein the alcohol is methanol.

8. An ionic composition as claimed by claim 6 wherein the alcohol is ethanol.

9. An ionic composition as claimed by claim 1 wherein the salt is nitrate.

10. An ionic composition as claimed by claim 9 wherein the alcohol is methanol.

11. An ionic composition as claimed by claim 9 wherein the alcohol is ethanol.

References Cited

UNITED STATES PATENTS

| | | | |
|---|---|---|---|
| 3,282,851 | 11/1966 | Muehlberg et al. | 260—2X |
| 3,318,870 | 5/1967 | Teumak | 260—438.1X |
| 3,329,512 | 7/1967 | Shipley et al. | 117—130X |
| 3,346,527 | 10/1967 | Lagally | 260—2X |
| 3,393,135 | 7/1968 | Rosenberg | 204—55 |
| 3,403,035 | 9/1968 | Schneble et al. | 117—130X |
| 3,458,542 | 7/1969 | Moore et al. | 260—430X |

FOREIGN PATENTS

| | | | |
|---|---|---|---|
| 1,232,800 | 1/1967 | Germany | 204—55 |

HAROLD ANSHER, Primary Examiner

J. C. GIL, Assistant Examiner

U.S. Cl. X.R.

106—1; 117—130, 160, 227; 161—213; 204—14, 20; 260—2, 33.4, 239, 429, 429.9, 430, 431, 438.1, 439